United States Patent
Balthes et al.

(10) Patent No.: US 9,458,799 B2
(45) Date of Patent: Oct. 4, 2016

(54) METHOD FOR OPERATING MOTOR VEHICLE INTERNAL COMBUSTION ENGINE

(75) Inventors: Ortwin Balthes, Sachsenheim (DE); Berthold Keppeler, Owen (DE); Siegfried Mueller, Ingersheim (DE)

(73) Assignee: Daimler AG, Stuttgart (DE)

(*) Notice: Subject to any disclaimer, the term of this patent is extended or adjusted under 35 U.S.C. 154(b) by 736 days.

(21) Appl. No.: 13/883,464

(22) PCT Filed: Oct. 18, 2011

(86) PCT No.: PCT/EP2011/005243
§ 371 (c)(1),
(2), (4) Date: Jul. 10, 2014

(87) PCT Pub. No.: WO2012/059179
PCT Pub. Date: May 10, 2012

(65) Prior Publication Data
US 2015/0316004 A1   Nov. 5, 2015

(30) Foreign Application Priority Data

Nov. 4, 2010   (DE) .................. 10 2010 050 406

(51) Int. Cl.
*F01N 3/02* (2006.01)
*F01N 3/10* (2006.01)
(Continued)

(52) U.S. Cl.
CPC .............. *F02M 25/07* (2013.01); *F01N 3/023* (2013.01); *F01N 3/0231* (2013.01); *F01N 3/035* (2013.01);
(Continued)

(58) Field of Classification Search
CPC .... F01N 13/009; F01N 3/023; F01N 3/0231; F01N 3/035; F01N 2240/36; F01N 2510/06; F01N 2550/02; F01N 2610/02; F01N 3/103; F01N 3/2066; F02B 29/00; F02B 29/0418; F02B 37/004; F02B 37/013; F02D 41/0007; F02D 41/0055; F02D 41/0235; F02M 25/07; F02M 25/0711; F02M 27/0718; F02M 25/0732; F02M 25/0744; Y02T 10/144; Y02T 10/146; Y02T 10/24; Y02T 10/47

USPC .............. 60/280, 286, 287, 288, 602, 605.2
See application file for complete search history.

(56) References Cited

U.S. PATENT DOCUMENTS 8,091,338 B2   1/2012   Yokoyama et al.
8,091,535 B2   1/2012   Nitzke et al.
(Continued)

FOREIGN PATENT DOCUMENTS

DE   199 26 148 A1   12/2000
DE   101 54 041 A1   5/2003
(Continued)

OTHER PUBLICATIONS

International Search Report dated Jul. 10, 2012 including partial English-language translation (Eight (8) pages).
(Continued)

Primary Examiner — Jesse Bogue
Assistant Examiner — Dapinder Singh
(74) Attorney, Agent, or Firm — Crowell & Moring LLP

(57) ABSTRACT

A method for operating a motor vehicle internal combustion engine that has an exhaust tract with an exhaust gas purification unit acting catalytically and/or by filtration with which combustion air supplemented by exhaust gas diverging from the exhaust tract is fed to the combustion chambers of the internal combustion engine by exhaust gas branching off from the exhaust tract at a total exhaust gas recirculation rate. The total exhaust gas recirculation rate has a low-pressure proportion diverging downstream from the exhaust gas purification unit and a high-pressure proportion diverging upstream from an exhaust gas turbocharger turbine arranged in the exhaust tract. An essentially decreasing low pressure proportion is set with at least approximately the same operating points of the internal combustion engine with an increasing operating period of the exhaust gas purification unit.

16 Claims, 2 Drawing Sheets

Figure 1:
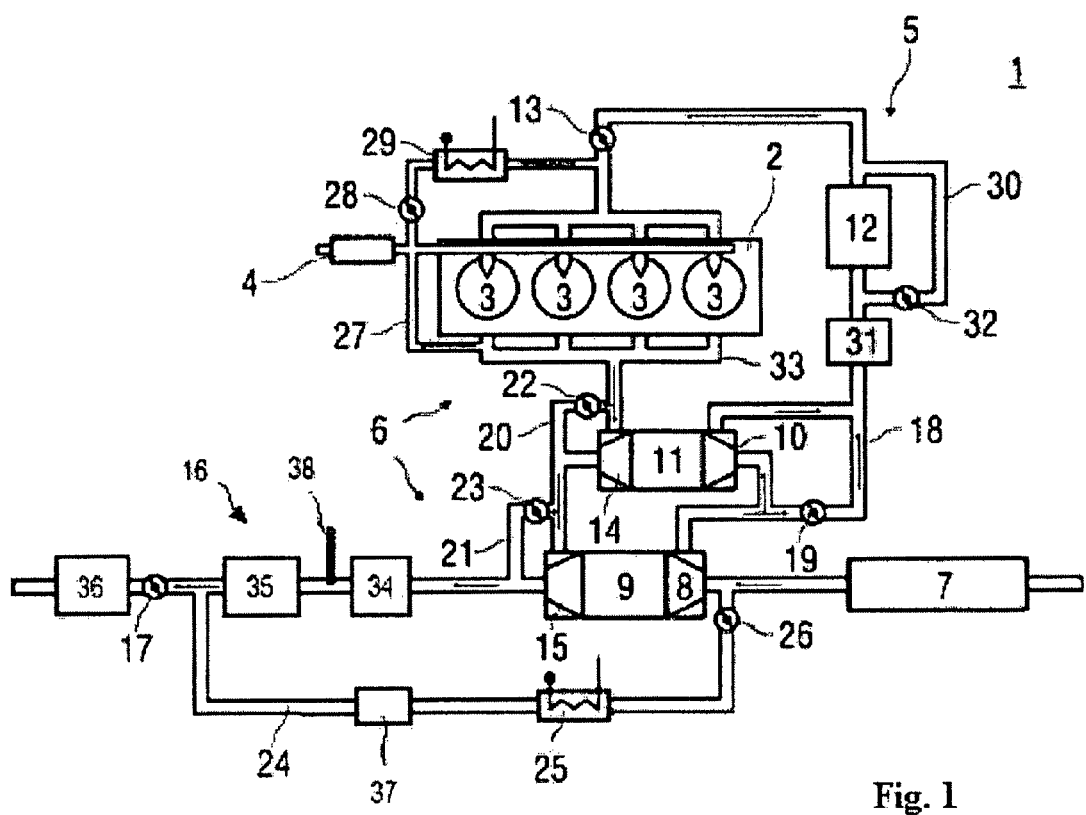

(51) Int. Cl.
| | |
|---|---|
| *F02B 29/00* | (2006.01) |
| *F02B 29/04* | (2006.01) |
| *F02D 41/00* | (2006.01) |
| *F02D 41/02* | (2006.01) |
| *F02M 25/07* | (2006.01) |
| *F01N 3/023* | (2006.01) |
| *F01N 3/035* | (2006.01) |
| *F02B 37/013* | (2006.01) |
| *F02B 37/00* | (2006.01) |
| *F01N 13/00* | (2010.01) |
| *F01N 3/20* | (2006.01) |

(52) U.S. Cl.
CPC ............ *F01N 13/009* (2014.06); *F02B 29/00* (2013.01); *F02B 29/0418* (2013.01); *F02B 37/004* (2013.01); *F02B 37/013* (2013.01); *F02D 41/0007* (2013.01); *F02D 41/0055* (2013.01); *F02D 41/0235* (2013.01); *F02M 26/00* (2016.02); *F02M 26/08* (2016.02); *F02M 26/15* (2016.02); *F02M 26/24* (2016.02); *F02M 26/38* (2016.02); *F01N 3/103* (2013.01); *F01N 3/2066* (2013.01); *F01N 2240/36* (2013.01); *F01N 2510/06* (2013.01); *F01N 2550/02* (2013.01); *F01N 2610/02* (2013.01); *F02M 26/35* (2016.02); *Y02T 10/144* (2013.01); *Y02T 10/146* (2013.01); *Y02T 10/24* (2013.01); *Y02T 10/47* (2013.01)

(56) References Cited

U.S. PATENT DOCUMENTS

| | | |
|---|---|---|
| 2008/0018170 A1 | 1/2008 | Cermak |
| 2012/0023937 A1* | 2/2012 | Styles ................. F02D 9/02 60/605.2 |

FOREIGN PATENT DOCUMENTS

| | | |
|---|---|---|
| DE | 10 2008 002 366 A1 | 1/2009 |
| DE | 10 2009 021 114 A1 | 11/2010 |
| EP | 1 653 058 A1 | 5/2006 |
| WO | WO 2008/058596 A1 | 5/2008 |
| WO | WO 2009/046292 A2 | 4/2009 |
| WO | WO 2009/142989 A2 | 11/2009 |

OTHER PUBLICATIONS

German-language Written Opinion (PCT/ISA/237) (Seven (7) pages).

\* cited by examiner

METHOD FOR OPERATING MOTOR VEHICLE INTERNAL COMBUSTION ENGINE

CROSS-REFERENCE TO RELATED APPLICATIONS

The present application is related to PCT International Application Number PCT/EP2011/005244, filed Oct. 18, 2011, a national stage application of which is U.S. patent application Ser. No. 13/883,387, now U.S. Pat. No. 8,833,059, issued Sep. 16, 2014.

BACKGROUND AND SUMMARY OF THE INVENTION

Exemplary embodiments of the present invention relate to a method for operating a motor vehicle internal combustion engine.

German patent publication DE 102009021114.4 describes a method for operating an internal combustion engine with an exhaust tract featuring an exhaust gas purification unit which acts catalytically and/or by filtration in which fuel and a combustion gas featuring a part containing air and a part containing exhaust gas that is recirculated from the exhaust tract are fed to the combustion chambers of the internal combustion engine. At the same time, the recirculated exhaust gas can be supplied to the internal combustion engine with a low-pressure proportion via a low-pressure path diverging from the exhaust tract downstream of the exhaust gas purification unit, and to the combustion chambers with a high-pressure proportion via a high pressure path diverging from the exhaust tract upstream of an exhaust gas turbocharger turbine. By appropriate adjustment of the low-pressure proportion and the high-pressure proportion of the recirculated exhaust gas, the method disclosed in DE 102009021114.4 also enables, among other things, an effective purification of the exhaust gas, wherein, however, the effectiveness of changes that occur over the operating period of the exhaust gas purification unit are not taken into account.

By contrast, the exemplary embodiments of the present invention provide a method for operating a motor vehicle internal combustion engine that enables the purification of exhaust gas that is as constant as possible over the operating period of the exhaust gas purification unit.

The inventors have recognized that when calibrating a low-pressure proportion of recirculated exhaust gas that essentially decreases with an increased operating period, in the case of operating points of the internal combustion engine that are at least almost the same, efficiency changes occur over time in the exhaust gas purification unit, which can be compensated in an advantageous manner. This results in improved stability of the purification performance. In particular, it is possible to compensate an ageing-related decrease in the catalytic efficiency of the exhaust gas purification unit. One explanation for this surprising effect is at least partially to be seen in an ageing-compensating reduction in the flow of exhaust gas through the exhaust gas purification unit and in a favorable influence on the thermal conditions in the exhaust gas purification unit.

The method can be applied especially advantageously in an air compressing internal combustion engine, but also in the case of internal combustion engines with spark ignition. The exhaust gas purification unit, which acts catalytically and/or by filtration, preferably comprises an oxidation catalytic converter and a particle filter.

The low-pressure proportion of recirculated exhaust gas that essentially decreases with an increased operating period means a process that is comparatively slow to change and which typically extends over a total operating period of the exhaust gas purification unit provided. In connection with this, the entire operating period is assumed to represent a distance of 100,000 km to 200,000 km (for the corresponding vehicle). Preferably, the decrease in the low-pressure proportion is linked to a decrease in the purification performance and/or the catalytic efficiency of the exhaust gas purification unit that usually occurs over the operating period as a result of ageing. The decrease in the in the low-pressure proportion of the recirculated exhaust gas takes place at least in the main part of the operational range of the internal combustion engine, preferably continuously over the operating period of the exhaust gas purification unit. At least a decreasing trend for the low-pressure proportion of the recirculated exhaust gas over the operating period is provided. At the same time, a greater decrease can take place during certain operating periods than during other operating periods. For example, in accordance with the course of ageing of the oxidation catalytic converter that is preferably available for an entire operating period with a distance of approximately 200,000 km, a greater decrease in the low-pressure proportion of the recirculated exhaust gas is provided during the first 50,000 km than in the remaining 150,000 km. Depending on the operating point, the low-pressure proportion of the recirculated exhaust gas can decrease by about 100% in the case of a new, non-aged exhaust gas purification unit and up to 0% in the case of a marginally aged exhaust gas purification unit at the end of its operating period. The total exhaust gas recirculation rate, i.e. the proportion of the recirculated exhaust gas of the overall combustion gas that is fed back to the internal combustion engine in order to burn fuel, can vary to a large extent and typically ranges from 5% to 50%.

In an embodiment of the method, in the case of operating points of the internal combustion engine that are at least almost the same, the total exhaust gas recirculation rate is mainly kept constant with an increased operating period of the exhaust gas purification unit. In particular, it is provided that, with the same operating points in the load-speed engine characteristics of the internal combustion engine, the total exhaust gas recirculation rate will vary by less than 10% relatively over an operating period corresponding to a distance of approximately 150,000 km to 200,000 km. As a result of a total exhaust gas recirculation rate (for the same operating points) that is at least almost constant over the overall operating period of the exhaust gas purification unit provided, the untreated emission of contaminants from the internal combustion engine likewise remains almost constant over time with the same operating points, something which is advantageous for the designing of the exhaust gas purification unit. In accordance with the invention, in the course of the operating period, ageing-related efficiency changes in the exhaust gas purification unit or a related exhaust air purification component are mainly or almost exclusively compensated for by a reduction in the ratio of the low-pressure proportion to the high-pressure proportion with respect to the recirculated quantity of exhaust air.

In another embodiment of the method, an essentially decreasing low-pressure proportion is set with increasing mass flow of exhaust gas upstream of the divergence for the low-pressure proportion. As a result of this measure, the increase in the mass flow of exhaust air is counteracted, so that it is lower. Accordingly, the exhaust air purification unit will be increasingly less charged with an increased operating period and/or increased ageing with reference to the exhaust gas throughput. This enables at least a partial compensation of an ageing-related decrease in performance.

In another embodiment of the method, an essentially decreasing total exhaust gas recirculation rate is set with increasing mass flow of exhaust gas upstream of the divergence for the low-pressure proportion. At the same time, a further embodiment of the method provides for a greater decrease to be set in the low-pressure proportion than for the decrease in the total exhaust gas recirculation rate. As a result of these measures, the efficacy-reducing effect of an increasing mass flow of exhaust gas is advantageously counteracted.

In a further embodiment of the method, in an exhaust gas purification unit that is at least almost new, the low-pressure proportion is set to be at least twice as large as that of an exhaust purification unit operating period which corresponds to a distance for the associated motor vehicle of at least 100,000 km. As it has been possible to verify through trials, through these considerations, it is possible to compensate ageing-related decreases in efficiency in the exhaust gas purification unit and/or its exhaust gas purification components to an almost optimum extent.

In a further embodiment of the method, by means of an SCR catalyst, a reduction of the nitrogen oxides contained in the exhaust gas takes place downstream of an oxidation catalytic converter of the exhaust gas purification unit. An SCR catalyst is the term that is usually used to describe a catalytic exhaust gas purification component which is capable of catalysing a reduction of nitrogen oxides using ammonia as a reducing agent when there is an excess of oxygen. A selective catalytic reduction of nitrogen oxide can be provided either upstream and/or downstream of the divergence for the low-pressure proportion of the recirculated exhaust gas. It is particularly advantageous to provide a monolithic SCR catalyst, at least downstream of the divergence for the low-pressure proportion. In addition, an exhaust gas purification component that enables the selective catalytic reduction of nitrogen oxide can be provided upstream of the divergence for the low-pressure proportion. Preferably, also upstream of the divergence for the low-pressure proportion, a facility is provided for reducing particles in the exhaust gas, especially by means of a particle filter. As such, in this case, the exhaust gas purification unit upstream of the divergence for the low pressure proportion of the recirculated exhaust gas includes at least one oxidation catalytic converter and one particle filter. The aforementioned unit is preferably formed as a wall-perfused monolithic particle filter, especially one based on silicon carbide. Preferably, a catalytic coating is provided for the particle filter. This may, for example, exhibit an oxidation catalytic function or a function that promotes the oxidation of carbon particulate. Through this segmentation of the exhaust gas purification means, a particularly long-term stable exhaust gas purification is brought about in connection with the returning of low-pressure exhaust gas (as provided), especially with respect to nitrogen oxide reduction.

In a further embodiment of the method, the low-pressure proportion and/or a quantity of post-injected fuel can be set in such a way that the nitrogen dioxide proportion of nitrogen oxide contained in the exhaust gas (on the output of the oxidation catalytic converter and/or on the input of the SCR catalyst) is less than 70% (especially approximately 50% or less). If it is not possible to limit the $NO_2$ content to these values by varying the low-pressure proportion, the method preferably provides for a late injection of fuel to take place so that these values are reached. This way, an optimization of the catalytic action of the SCR catalyst can be achieved. As a result of the decreasing low-pressure proportion of the recirculated exhaust gas over time, the optimization of long-term stability is made possible with comparable operating points. If necessary, the subsequent injection of fuel into one or more combustion chambers of the internal combustion engine test is preferably carried out at such a late point in the combustion cycle that the exhaust gas is enriched with non-combusted or partially combusted fuel components.

A motor vehicle internal combustion engine for carrying out one of the methods described above is advantageous, which has an air supply system for supplying combustion air to the internal combustion engine and an exhaust tract for admitting exhaust gas from the internal combustion engine, in which an oxidation catalytic converter, a particle filter and an SCR catalyst are arranged behind each other in the direction of flow of the exhaust gas. As such, an adding device for adding ammonia or a reduction means capable of separating ammonia is provided upstream of the SCR catalyst for the internal combustion engine in accordance with the invention. Furthermore, a first exhaust gas turbocharger is provided, the turbine of which is arranged upstream of the oxidation catalytic converter in the exhaust tract. A first exhaust gas recirculation line diverging from exhaust tract for returning exhaust air from the exhaust tract into the air supply system is provided upstream of the especially first exhaust gas turbocharger as well as a second exhaust gas recirculation line diverging from the exhaust tract between the particle filter and the SCR catalyst. At the same time, further adjusting means are provided for adjusting the quantity of exhaust air that is recirculated via the first and/or second exhaust gas recirculation line into the air supply system. The first exhaust gas recirculation line, which diverges upstream from the exhaust gas turbocharger turbine, represents a return path for high-pressure exhaust gas, via which a high-pressure proportion of the recirculated exhaust gas can be fed from the exhaust gas tract into the air supply system. On the other hand, the second exhaust gas recirculation line that diverges from the exhaust gas line between the particle filter and the SCR catalyst represents a return path for the low-pressure exhaust gas, via which a low-pressure proportion of the recirculated exhaust gas can be fed into the air supply system. As a result of the adjusting means provided in accordance with the invention, it is likewise possible to variably adjust the ratio of the low pressure proportion to the high pressure proportion of the total recirculated exhaust gas, as well as variably adjust the total quantity of recirculated exhaust gas.

In particular, the adjustment means for adjusting the low-pressure proportion or the high-pressure proportion of the total quantity of recirculated exhaust gas are also used, depending on the operating point of the internal combustion engine and the state of obsolescence (especially that of the oxidation catalytic converter), to adjust a nitrogen dioxide ($NO_2$) proportion that is advantageous for the catalytic reduction of nitrogen oxide of the SCR exhaust gas purification component of the nitrogen oxides (NOx) that are present in the exhaust gas on the inlet side of the SCR exhaust gas purification component. Thus, an adjustment of the low-pressure proportion of the recirculated exhaust gas is particularly carried out in such a way that a proportion results (composed of $NO_2$) which is lower than 70%. It is particularly preferable to adjust the low-pressure proportion in such a way that the $NO_2$ proportion of $NO_2$ contained in the exhaust gas is approximately 50%.

The addition of ammonia that is provided upstream of the SCR catalyst or the addition of a reducing agent that is capable of separating ammonia can be provided between the oxidation catalytic converter and the particle filter or additionally/alternatively, between the particle filter and the SCR catalyst, upstream or downstream of the point of divergence of the second exhaust gas recirculation line. In the case of a particle filter that is provided with a coating that is active for oxidation catalysis, it should be preferably arranged between the particle filter and the SCR catalyst. In the case of a coating of the particle filter with an SCR catalyst material, it should be preferably arranged between the oxidation catalytic converter and the particle filter.

Provision may be made for the means to comprise, for adjusting the recirculated quantity of exhaust gas, an adjustable restrictor element, arranged in the exhaust tract between the point of divergence of the second exhaust gas return line and the SCR catalyst and/or in the second exhaust gas return line before the point where it flows into the air supply system, and/or an adjustable restrictor element, arranged in the first exhaust gas return line before the point where it flows into the air supply system.

The particle filter can include a coating with an SCR catalyst material. This embodiment enables a selective catalytic reduction of nitrogen oxides using ammonia upstream of the divergence of the second exhaust gas recirculation line as well as downstream thereof. Even when the internal combustion engine is charged at a low level, the SCR catalyst material coating of the particle filter exhibits a temperature that is sufficient to reduce nitrogen oxide. Even under unfavorable conditions (where the SCR catalyst is below its start-up temperature downstream of the point of divergence of the second exhaust gas recirculation line) this allows for a sufficient reduction in nitrogen oxides. Furthermore, by increasing the quantity of exhaust gas recirculated via the low pressure path, conditions are enabled for the SCR catalyst to be relieved with respect to the quantity of exhaust gas flowing through it and in this way, allow for its efficiency to be improved.

A second SCR catalyst can be arranged in the second exhaust gas recirculation line. As a result, this enables a further increase in nitrogen oxide conversion. The second SCR catalyst in the second exhaust gas recirculation line allows for further relief, especially of the SCR catalyst arranged downstream of the divergence of the second exhaust gas recirculation line and, if necessary, also the SCR catalyst material coating of the upstream particle filter.

A second exhaust gas turbocharger can be provided, the turbine of which is arranged downstream of the turbine of the first exhaust gas turbocharger in the exhaust gas tract. This enables two-tiered charging of the internal combustion engine with a corresponding increase in efficiency with a comparatively reduced pollutant discharge.

A bypassable charge air cooler can be arranged in the air supply system for cooling compressed combustion air. This enables a variable decrease in the internal combustion temperature of combusted fuel in the combustion chambers of the internal combustion engine and thus a further decrease in the pollutant emission of the internal combustion engine, in particular with respect to nitrogen oxide.

An exhaust gas cooler can be arranged in the first exhaust gas return line and/or the second exhaust gas recirculation line in order to cool the exhaust gas that is recirculated to the air supply system. This measure also enables a decrease in the combustion temperatures. At the same time, it is advantageous if a bypass line, especially one with a flow regulator, is provided in a further embodiment of the invention for the exhaust gas cooler arranged in the first exhaust gas recirculation line and/or in the second exhaust gas recirculation line.

Further advantages, features and details of the invention arise from the description of preferred exemplary embodiments below, as well as with the aid of the figures. The features and feature combinations cited in the description above and the features and feature combinations cited below in the description of the figures and/or shown in the figures alone are not only usable in the respective combination as stated, but also in other combinations or individually, without exceeding the scope of the invention.

BRIEF DESCRIPTION OF THE DRAWING FIGURES

Figure 2:
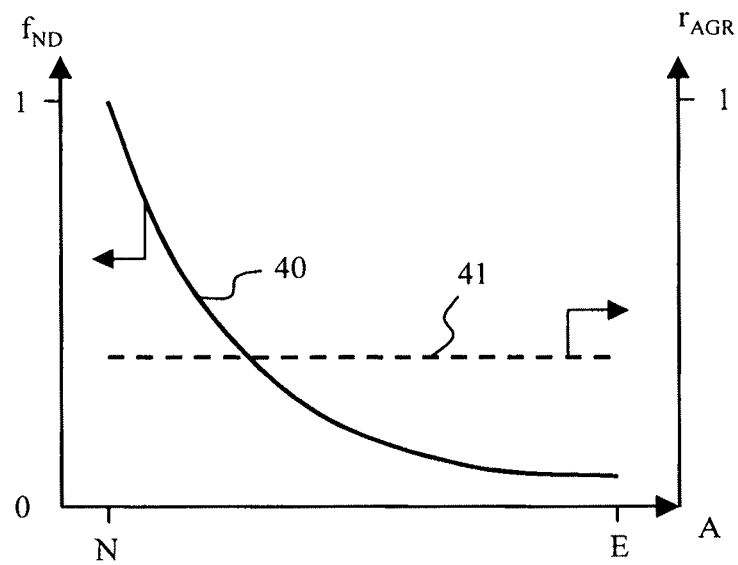
Figure 3:
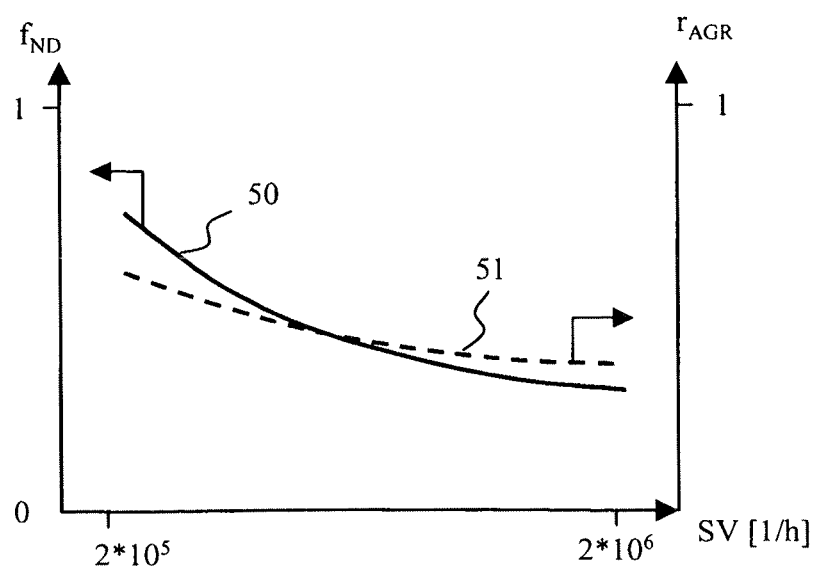

As numbered, the figures show:

FIG. 1 a schematic depiction of an advantageous embodiment of an internal combustion engine with an air supply system and exhaust tract with exhaust gas purification unit for carrying out the method in accordance with the invention;

FIG. 2 a diagram with a schematic depiction of the method in accordance with the invention providing for the course of the low-pressure proportion and the total quantity of recirculated exhaust gas over an operating period of the exhaust gas purification unit of an internal combustion engine according to FIG. 1; and FIG. 3 a diagram with a schematic depiction of the method in accordance with the invention providing for the course of the low-pressure proportion and the total quantity of recirculated exhaust gas depending on a space velocity of the exhaust gas supplied from an internal combustion engine according to FIG. 1.

DETAILED DESCRIPTION

FIG. 1 shows a schematic depiction of an advantageous embodiment of an air compressing internal combustion engine 1 with two-tiered charging and two-tiered exhaust gas recirculation, in which the method described in greater detail below can be applied. The internal combustion engine 1 comprises an engine block 2 with working cylinders 3 with combustion chambers that are not illustrated in greater detail, wherein fuel can be supplied to the working cylinders 3 or the respective combustion chamber by means of a high-pressure pump 4. An air supply system 5 supplies the working cylinders 3 and/or the respective combustion chamber and an exhaust gas tract 6 conducts exhaust gas away from the working cylinders 3. The air supply system 5 includes an air filter 7, a first compressor 10 of a first exhaust gas turbocharger designed as a high-pressure exhaust gas turbocharger 11, a second compressor 8 of a second exhaust gas turbocharger designed as a low-pressure exhaust gas turbocharger 9, a charge air cooler 12 and a restrictor valve 13.

Starting from the engine block 2, a first turbine 14, which is allocated to the high-pressure exhaust gas turbocharger 11, a second turbine 15, which is allocated to the low-pressure exhaust gas turbocharger 9, an exhaust gas purification unit 16 and an exhaust gas retention flap 17 downstream thereto are arranged in the exhaust gas tract 6 in the flow direction of the exhaust gas. The exhaust gas purification unit 16 presently comprises a particle filter 35 and an upstream oxidation catalytic converter 34.

The particle filter 35 can be designed as sintered metal or as a permeable filtering unit featuring a honeycomb body construction method. Preferably, a catalytic coating is provided for the particle filter, for example with an oxidation catalytic material. In a particularly preferred embodiment, a coating with an SCR catalyst material is provided.

One or more additional exhaust gas post-processing components that are effective for purification can be arranged upstream and/or downstream of the exhaust gas purification unit 16 in the exhaust tract 6, for example an oxidation catalytic converter, an SCR catalyst and/or a nitrogen oxide storage catalyst. Such exhaust gas purification components are known to persons skilled in the art, and this is a reason why they are not described here in greater detail. An SCR catalyst 36 is arranged in the exhaust tract 6, downstream of the particle filter 35. In order to supply ammonia to the SCR catalyst 36 or, if necessary, to the SCR catalyst coating of the particulate filter 35, an adding device 38 is provided, which can inject ammonia or a reducing agent capable of separating ammonia (such as a urea-water solution) into the exhaust tract 6. A downstream mixer that is not depicted separately can be arranged in the exhaust gas tract 6 to improve equal distribution.

A compressor bypass 18, which bypasses the high-pressure turbocharger 11, diverges downstream of the second compressor 8, in which a compressor bypass valve 19 is arranged so that by means of the second compressor 8, compressed fresh air or a fresh air and exhaust gas mixture (depending on an operating state of the internal combustion engine 1 and a resultant setting of the compressor bypass valve 19) can pass through the first compressor 10 to a greater or lesser extent. In this way, a charging pressure of the internal combustion engine 1 is adjustable, or when the speed of the internal combustion engine 1 is low and the high-pressure exhaust gas turbocharger 11 still cannot be operated due to the exhaust gas pressure being too low, the first compressor 10 can be circumvented by the compressor bypass 18.

Bypasses 20, 21 are also arranged in the exhaust gas tract 6, each of which bypass a turbine 14, 15, namely a first turbine bypass 20, in which a first turbine bypass valve 22 is arranged, and a second turbine bypass 21, in which a second turbine bypass valve 23 is arranged. When the speed of the internal combustion engine 1 is low and, as a consequence of this, there is low exhaust gas pressure, the high-pressure exhaust gas turbocharger 11 still cannot be operated. For this reason, the first turbine bypass valve 22 can be activated in this operating status in such a way that an exhaust gas mass flow can be fed via the first turbine bypass 20 to the first turbine 14 and as such, and can thus be used fully to drive the second turbine 15 of the low-pressure exhaust gas turbocharger 9.

When the speed of the internal combustion engine 1 is very high, the exhaust gas pressure acting on the turbines 14, 15 of the exhaust gas turbocharger 9, 11 is high, whereby these achieve high speeds. As a result of this, there is a high level of compressor output for the compressors 8, 10 of the exhaust gas turbochargers 9, 11, and consequently, a high charging pressure of the fresh air-exhaust gas mixture. However, this pressure should not exceed a set value, such that when this set value is reached, one or both turbine bypasses 20, 21 can be used as so-called "wastegates". For this, the turbine bypass valves 22, 23 can be activated in such a way that, for example, they open partially, whereby part of the exhaust gas mass flow can be fed around the turbines 14, 15 and as a result, the exhaust gas pressure that acts on and drives the turbines 14, 15 can be reduced. This results in low compression of the gas compressed by the compressors 8, 10 of the exhaust gas turbochargers 9, 11, i.e. a lower charging pressure.

The efficiency of the internal combustion engine 1 can be optimized in various speed ranges by means of this arrangement of the low-pressure exhaust gas turbocharger 9 and the high-pressure exhaust gas turbocharger 11 and in each case, an optimal charging pressure can be provided. Through this, it is possible to prevent a so-called 'turbo-lag', i.e. non-existent or low charging pressure and the consequential low performance of such an internal combustion engine 1 at low speed ranges or, at least reduce this problem considerably. For example, the handling performance and fuel consumption of a vehicle powered by this internal combustion engine 1 can be optimized.

Downstream of the exhaust gas purification unit 16, i.e. on a low-pressure side of the exhaust tract 6, a low-pressure exhaust gas recirculation (EGR) line 24 diverges from the exhaust gas tract 6 between the particle filter 35 and the SCR catalyst 36, which flow back into the air supply system 5 upstream of the second compressor 8 of the low pressure exhaust gas turbocharger 9 and downstream from the air filter 7. A low-pressure EGR cooler 25 and a low-pressure EGR valve 26 are arranged in the low-pressure EGR line 24 downstream of the divergence from the exhaust gas tract 6, as seen in the flow direction of a low-pressure EGR mass flow. Optionally, the cooling of the low-pressure EGR mass flow can take place when the low-pressure EGR cooler 25 is dispensed with via the pipe lengths or pipe forms that are used. Cooling the low-pressure EGR mass flow ensures that inadmissibly high temperatures do not arise at the compressors 8, 10 when the exhaust gas recirculation is operating. In the particularly advantageous embodiment depicted in FIG. 1, a second SCR catalyst 37 is also provided in the low-pressure EGR line 24 upstream of the low-pressure EGR cooler 25. The second SCR catalyst 37 enables a reduction of the nitrogen oxide and/or ammonia and/or oxygen that, as the case may be, is available in the recirculated exhaust gas. In turn, through this, deposits and the appearance of corrosion are avoided or reduced and this enables an improved sequence of the fuel combustion that takes place in the combustion chambers of the internal combustion engine 1. Furthermore, the second SCR catalyst can take on a filtering function in such a way that at least comparatively large particles are removed from the exhaust gas that is recirculated via the low-pressure path.

Upstream of the turbine 14 of the high-pressure exhaust gas turbocharger 11 (i.e. on a high-pressure side of the exhaust tract 6) a high-pressure EGR line 27 diverges from an exhaust manifold 33 of the exhaust tract 6 and flows into the air supply system 5 downstream of the restrictor valve 13. By means of this high-pressure EGR line 27, it is possible to feed a high-pressure EGR mass flow into the air supply system 5 via a high-pressure EGR valve 28. In the embodiment depicted, a high-pressure EGR cooler 29 is arranged in the high-pressure EGR line 27 which, if necessary, can be structurally and/or functionally combined with the low-pressure EGR cooler 25. Optionally however, a cooling of the high-pressure EGR mass flow can, for example, also take place via a length of tubing belonging to the high-pressure EGR line 27. Bypass lines, especially ones with adjusting means for variable flow rate adjustment (not depicted separately) can be provided for the low-pressure EGR cooler 25 and/or the high-pressure EGR cooler 29.

The depicted internal combustion engine 1 has an exhaust gas recirculation unit, in which exhaust gas can be removed from the exhaust gas tract 6 upstream of the turbine 14 of the high-pressure exhaust gas turbocharger 11 via a corresponding high-pressure path, and downstream of the exhaust gas purification unit 16 via a corresponding low-pressure path and, if necessary, after cooling, can be fed upstream of the compressor 8 of the low-pressure exhaust gas turbocharger 9 and downstream of the restrictor valve 13 of the air supply system 5 and thus to the combustion chambers 3 of the internal combustion engine 1. As an option, the combustion engine 1 can be operated without an exhaust gas recirculation, with a high-pressure exhaust gas recirculation, a low-pressure exhaust gas recirculation, or simultaneously with a high-pressure exhaust gas recirculation and a low-pressure exhaust return with variable exhaust gas recirculation quantities in each case. As such, in the combustion chambers 3 of the internal combustion engine 1, a combustion gas with an exhaust gas recirculation rate that can be altered to a large extent, can be fed with a variable low-pressure proportion and a variable high-pressure proportion. An adjustment of an exhaust gas recirculation quantity, i.e. of the recirculated exhaust gas mass flow and with it, the EGR rate, is carried out by means of the exhaust gas retention flap 17 and/or the low-pressure EGR valve 26 as well as by means of the high-pressure EGR valve 28 as adjusting means, whereby the low-pressure proportion and high-pressure proportion of the total quantity of recirculated exhaust gas can also be adjusted to a large extent. Overall, this results in clean return mass flows of exhaust gas, a better cooling of the return mass flows of exhaust gas, avoidance of the EGR cooler 25, 29 from becoming sooted and enables a good mixing of return mass flows of exhaust gas with the fresh air in the air supply system 5. High EGR rates are possible as well as a homogeneous or at least partially homogenous operation of the internal combustion engine 1.

The exhaust gas retention flap 17 and the low-pressure EGR valve 26 are presently regulator elements of an exhaust gas recirculation regulator that has an embodiment as an initial control regulator. Both the low-pressure EGR valve 26 and the exhaust gas retention flap 17 are preferably continuously adjustable. With the aid of the exhaust gas retention flap 17 and the low-pressure EGR valve 26 before the compressor 8, the low-pressure proportion of the entire mass flow of recirculated exhaust gas can be adjusted and as such, the latter can also be influenced. As long as there is a sufficient pressure drop for pumping the low-pressure mass flow of recirculated exhaust gas, this is initially solely adjustable via the low-pressure EGR valve 26. If this is no longer the case, the exhaust gas retention flap 17 is also somewhat adjustable, so as to increase the drop in pressure via the low-pressure EGR valve 26. This ensures a very good mixing of the low-pressure mass flow of recirculated exhaust gas with fresh air. Among other things, a further advantage is that the exhaust gas that is recirculated via the low-pressure path is clean and virtually pulsation-free. In addition, increased compressor efficiency is available. This is because in the case of a high low-pressure proportion of the recirculated exhaust gas, a comparatively high exhaust gas mass flow can be fed through the turbines 14, 15. As the recirculated exhaust gas can be fed through the efficient charge air cooler 12 after the compressors 8, 10, the temperature of the combustion gas containing the fresh air and exhaust gas can also be kept relatively cool. According to need, the internal combustion engine 1 is operable with the high-pressure exhaust gas recirculation as well as the low-pressure exhaust gas recirculation, or with both together.

By means of a charge air bypass 30 in the air supply system 5, which is preferably provided to bypass the charge air cooler 12, the sooting of the charge air cooler 12 can be avoided. The risk of this so-called sooting occurs, for example, when a gas mixture containing steam and, where necessary, particles is cooled in the charge air cooler 12 below the dew-point and there is a build-up of condensation.

Provision is preferably made for the entire fresh air-exhaust gas mixture, or even only a part of it to be able to be fed past the charge air cooler 12 via the charge air cooler bypass 30, which diverges upstream of the charge air cooler 12, whereby it cannot be cooled by the charge air cooler 12 and as a result, the temperature does not drop below the dew-point. In order to ensure that the fresh air-exhaust gas mixture can still be cooled effectively by means of the charge air cooler 12, if necessary, i.e. when the fresh air-exhaust gas mixture is at high temperatures, a temperature sensor 31 is arranged downstream of the compressors 8, 10 and upstream of the charge air cooler 12 in the air supply system 5, such that, when a predetermined temperature is reached, a charge air cooler bypass valve 32 arranged in the charge air cooler bypass 30 can be activated accordingly whereupon, for example, this charge air cooler bypass valve 32 opens or closes completely or, in a further embodiment, partially opens.

Further sensors are preferably provided in the exhaust gas tract 6 and in the air supply system 5 for optimal operation of the internal combustion engine 1 (not depicted in greater detail for purposes of clarity). In particular, the temperature sensors and/or pressure sensors can be arranged on the outlet side of the exhaust manifold 33, in the turbine bypasses 20, 21, on the inlet and outlet side or within the exhaust gas recirculation unit 16, on the inlet and outlet side of the air filter 7, on the inlet and outlet side of the compressors 8, 10, in the exhaust gas recirculation lines 24, 27 and, if necessary, at additional points, in order to detect the temperature and pressure ratios. Furthermore, it is preferable for another air mass flow sensor to be provided downstream of the air filter 7 for the detection of the mass flow of fresh air. Furthermore, exhaust gas sensors are preferably provided in the exhaust gas tract 6, such as a lambda sensor in the exhaust manifold 33 as well as before and/or after the particle filter 16. Likewise, it is also preferable to provide for one or more nitrogen oxide sensors (not depicted separately), especially directly behind the oxidation catalytic converter 34 and/or behind the SCR catalyst 36. The signals of the available sensors can be processed by a control and regulation device (not depicted here) which in general, can detect operating status of the combustion engine 1 and in particular, the exhaust gas tract 6 and the air supply system 5, with the aid of the signals and stored characteristic lines and engine maps, and can adjust these by activating regulator elements in a controlled and/or regulated manner. In particular, exhaust gas recirculation mass flows in the low and high-pressure path, as well as a load state of the combustion engine 1 with respect to torque and mean pressure, as well as speed, can be detected or adjusted.

A low-pollutant operation of the internal combustion engine 1 is made possible within the scope of the invention. In particular, due to an influence of a low-pressure exhaust gas recirculation proportion and a high-pressure exhaust gas recirculation proportion, a temporally stable purification method with respect to nitrogen oxide is made possible over extensively long operating periods. Without any loss of generality, this is carried out in accordance with the invention for the embodiment of an internal combustion engine as is presently discussed with reference to FIG. 1 in that, in the case of operating points of the internal combustion engine 1 that are least approximately the same, an essentially decreasing low-pressure proportion of the total recirculated exhaust gas flow is set with an increasing operating period of the exhaust gas purification unit 16, especially with a correlating ageing of the associated oxidation catalytic converter 34. For clarity, the corresponding conditions are schematically shown in FIG. 2 as a diagram.

In the diagram shown in FIG. 2, the left ordinate shows a low-pressure proportion $f_{ND}$ of a total EGR quantity and the right ordinate shows an exhaust recirculation rate $r_{AGR}$ as a part of the total exhaust gas recirculation quantity of the combustion gas supplied to the internal combustion engine 1 via the air supply system 5, in each case via the abscissa for a time parameter A. On the abscissa, point N indicates a point in time at which the exhaust gas purification unit 16 or the corresponding oxidation catalytic converter 34 exhibits a new state with no or negligible ageing. On the other hand, point E indicates a point in time at which the lifetime of the exhaust gas purification unit 16 or associated oxidation catalytic converter 34 (as provided by the manufacturer or another party) expires (end of lifetime). Point in time E can be defined by a predeterminable or predetermined distance (for example, 200,000 km for the corresponding motor vehicle) or by a predetermined limit value for an ageing factor correlating with an ageing of the exhaust gas purification unit 16 or the oxidation catalytic converter 34. In a particularly advantageous variant, it is possible to provide the scale of the abscissa in relation to an ageing factor of the oxidation catalytic converter 34, i.e. in that it correlates to a decrease in its catalytic activity with respect to an oxidation of nitrogen monoxide (NO) to nitrogen dioxide ($NO_2$).

In the diagram of FIG. 2 the course of track 40 shows a continuous decrease of the low-pressure proportion $f_{ND}$ of the total exhaust gas recirculation quantity with an increasing time parameter A in accordance with the invention. At the same time, the course of track 40 can turn out more or less differently for different/same operating points in a load-speed engine map of the internal combustion engine 1. However, it is provided that a continuous decrease in the low-pressure proportion $f_{ND}$ is set via time parameter A and/or the operating period, at least within the vast majority of the engine map. As is shown, a decrease of approximately 1 or 100% respectively to approximately zero can be provided over a total operating period, especially in the case of medium load points.

The track 41 (also plotted in the diagram) indicates the exhaust gas recirculation rate $r_{AGR}$ in accordance with the invention that is kept approximately constant over the operating period for operating points of the internal combustion engine 1 that are at least approximately the same. An exhaust gas recirculation rate $r_{AGR}$ that is larger or smaller can be provided, depending on the operating point. Typically, a decreasing exhaust gas recirculation rate $r_{AGR}$ is set with an increasing load. As is shown as an example in FIG. 2, an exhaust gas recirculation rate $r_{AGR}$ of approximately 0.45 or 45% is preferable for an operating point in the range of a medium partial load. With respect to the oxidation catalytic converter 34, an exhaust gas recirculation rate of approximately 0.2 or 20% is an advantageous setting at an operating point in the upper load range with a space velocity of approximately 100,000 l/h and a temperature of the exhaust gas of approximately 350° C. In the present case, as a result of the decrease in the low-pressure proportion $f_{ND}$ of the total exhaust gas recirculation quantity with an increasing operating period as provided in accordance with the invention, the following effects can be achieved.

With a decreasing low-pressure proportion $f_{ND}$ of the total exhaust gas recirculation quantity with comparable operating points of the internal combustion engine 1, the flow of exhaust gas decreases through the exhaust gas purification unit 16 that is arranged upstream of the divergence of the second exhaust gas recirculation line 24. Thus, the flow charge on the oxidation catalytic converter 34 and the particle filter 35 is reduced, and a decrease in throughput-dependent catalytic activity as a result of inevitable ageing is compensated for. In many ways, this has particularly beneficial effects on the performance of the catalytic coating of the particulate filter 35 and the SCR catalyst 36 in their reduction of nitrogen oxide. On the one hand, an ageing-related fall in the catalytic efficiency of the SCR catalytic coating of the particle filter 35 is at least approximately compensated over the operating period. On the other hand, the performance of the oxidation catalytic converter 34 is almost retained, particularly with respect to the formation of nitrogen dioxide. As such, for the nitrogen oxide conversion through selective catalytic reduction using ammonia, it is possible to provide an advantageous nitrogen dioxide proportion in the exhaust gas containing 40% to 50% nitrogen oxides. This is provided over a predominant part of the main part of the operational range of the internal combustion engine 1 almost independent of distance and ageing. An excessive lowering of the nitrogen dioxide content the exhaust gas below 50% on the output side of the oxidation catalytic converter 34 as a result of its ageing-related efficiency loss is at least preventable for the performance of the SCR catalytic coating of the particle filter 35 in reducing nitrogen oxide. Furthermore, hydrolysis of urea that is supplied via the adding device 38 with decreasing exhaust gas throughput and, as a result, the course of a subsequently performed selective catalytic reduction in the level of nitrogen oxide, is improved.

As has been illustrated, with a temporally decreasing low-pressure proportion $f_{ND}$ of the total exhaust gas recirculation quantity, the performance of the SCR catalyst material coating of the particle filter 35 in reducing nitrogen oxide can be kept at least approximately constant, regardless of the operation period. As such, an increasing load on the downstream SCR catalyst 36 is at least largely preventable in the course of the operation period. This proves to be further advantageous as, due to the relatively remote arrangement of the SCR catalyst 36 from the engine, this is often operated at low temperatures and only slightly above its light-off temperature. From experience however, ageing causes a rise in the light-off temperature. For this reason, there is, especially, ageing sensitivity that is specifically designed for the SCR catalyst 36. As the nitrogen oxide charging of the SCR catalyst 36 is kept almost constant over the operating period, it is possible to limit an ageing-related reduction in its performance in relation to nitrogen oxide reduction. As such, in the opposite case, provision of additional catalyst volume for safety reasons is also avoided, and this enables further cost savings.

In terms of the illustrative relationships, it is preferable if the decrease in the low pressure proportion $f_{ND}$ of the total exhaust gas recirculation quantity (which is provided in accordance with the invention) is coupled to, or correlates with, a decrease in the effectiveness of the oxidation catalytic converter 34 that takes place with respect to the oxidation of nitrogen monoxide to nitrogen dioxide over the operating period.

In the case of a new or slightly aged exhaust gas purification unit 16, the decrease in the low pressure proportion $f_{ND}$ of the total exhaust gas recirculation quantity (which is provided in accordance with the invention) over the operating period results in a exhaust gas flow rate that is relatively high with comparable operating points, and the oxidation catalytic converter 34 is charged at a comparatively high rate. As such, a pronounced formation of nitrogen dioxide in a new or slightly aged state of the oxidation catalytic converter 34 (which would be detrimental to the selective reduction of nitrogen oxide provided downstream) is counteracted.

Since the selective catalytic reduction of nitrogen oxide is adversely affected where the nitrogen dioxide proportion is above approximately 50%, provision may be made for the oxidation catalytic converter 34 to be sized so that nitrogen dioxide formation in a new state is limited to about 50%, at least in the main operating range of the internal combustion engine 1. If this is not possible or only possible to a limited extent, it is preferable to additionally or alternatively provide a way of preventing an undesirably high level of nitrogen dioxide from forming by enriching the exhaust gas with uncombusted fuel components. As has been recognized by the inventors, uncombusted fuel components have an inhibiting effect on the catalytic effect of typically used oxidation catalytic converters with respect to the oxidation of nitrogen monoxide to nitrogen dioxide. In particular, in the case of a new oxidation catalytic converter 34 (or one which is not so old) and/or low space velocities of, for example, less than 30,000 l/h, a late fuel injection can be provided into one or more of the working cylinders 3 of the internal combustion engine 1 for this purpose. This is preferably adjusted in such a way that a nitrogen dioxide proportion of less than 70%, (especially 50% or less) arises on the input side of the first component in the exhaust tract 6 with a property for carrying out a selective catalytic reduction of nitrogen oxides with ammonia. Preferably, there is a post-injection at a crank angle of 30 to 90 degrees following the upper dead center of the compression stroke. A post-engine adding of fuel upstream of the oxidation catalytic converter 34 is also possible as well as advantageous for supporting a regeneration of the particle filter 35.

As has been illustrated above, overall, a nitrogen dioxide proportion ranging from approximately 40% to 50% in the exhaust gas, which is favorable for selective catalytic nitrogen oxide reduction, can be set largely independently of a distance and the operating point through an essentially decreasing low-pressure proportion $f_{ND}$ with an increasing operating period of the exhaust gas purification unit, and optionally in combination with a late fuel injection.

Furthermore, a setting of the low-pressure proportion $f_{ND}$ of the total exhaust gas recirculation quantity (independent of the exhaust gas mass flow) and/or the ratio of the low-pressure proportion $f_{ND}$ and the high-pressure proportion of the total exhaust gas recirculation quantity is provided, especially for a beneficial effect on a selective catalytic reduction of nitrogen oxides provided in the exhaust tract 6 by adjusting a nitrogen dioxide proportion that is favorable for this as well as for the operation of the internal combustion engine 1 overall. Furthermore, depending on the exhaust gas mass flow supplied by the internal combustion engine 1, a variation of the total exhaust gas recirculation rate is provided. In order to explain the preferable settings provided, reference is made below to FIG. 3.

In the diagram depicted in FIG. 3, in the same way as FIG. 2, the left ordinate shows a low-pressure proportion $f_{ND}$ of a total EGR quantity and the right ordinate shows an exhaust gas recirculation rate $r_{AGR}$ as a part of the total exhaust gas recirculation quantity of the combustion gas supplied to the internal combustion engine 1 via the air supply system 5. A space velocity SV of the exhaust gas supplied by the internal combustion engine 1 is plotted on the abscissa corresponding to the two ordinates. The stated SV values merely illustrate the parameters by way of an example and as such, they may relate to the volume of the oxidation catalytic converter 34 or the SCR catalyst 36.

As is shown by the track 50, in accordance with the invention, provision is made for setting a decreasing low-pressure proportion $f_{ND}$ with increasing space velocity SV, for the same operating points of the internal combustion engine 1. As has already been mentioned, in addition, there is a dependency of the low-pressure proportion $f_{ND}$ from the load point itself as well as the operating period. As such, track 50 only schematically reflects the decreasing trend in accordance with the invention.

In accordance with the invention, there is also provision for a decrease with increasing space velocity SV for the exhaust gas recirculation rate $r_{AGR}$, which is made clear by the course of the track 51. In accordance with the invention however, a greater decrease with increasing space velocity SV or an increasing exhaust gas mass flow is provided for the low-pressure proportion $f_{ND}$ than for the exhaust gas recirculation rate $r_{AGR}$. Preferably, with the same values for the space velocity SV, the gradient of track 50 is smaller, i.e. more negative, than the gradient of track 51.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for operating a motor vehicle internal combustion engine having an exhaust tract with an exhaust gas purification unit which acts catalytically or by filtration, the method comprising:
   supplementing combustion air by exhaust gas, diverging from the exhaust tract, that is fed to combustion chambers of the internal combustion engine at a total exhaust gas recirculation rate, wherein the total exhaust gas recirculation rate has a low-pressure proportion diverging downstream from the exhaust gas purification unit and a high-pressure proportion diverging upstream from an exhaust gas turbocharger turbine arranged in the exhaust tract; and
   adjusting the low pressure proportion of the total exhaust gas recirculation rate, as the low-pressure proportion decreases for operating points of the internal combustion engine, as an operating period of the exhaust gas purification unit increases.

2. The method according to claim 1, wherein at the operating points of the internal combustion engine, the total exhaust gas recirculation rate is kept constant as the operating period of the exhaust gas purification unit increases.

3. The method according to claim 1, wherein adjusting the low-pressure proportion is performed by increasing an exhaust gas mass flow upstream of a location at which the low-pressure proportion diverges from the exhaust gas purification unit.

4. The method according to claim 1, wherein a decreasing total exhaust gas return rate is set using an increasing exhaust gas mass flow upstream of the divergence for the low-pressure proportion.

5. The method according to claim 2, wherein a decreasing total exhaust gas return rate is set using an increasing exhaust gas mass flow upstream of the divergence for the low-pressure proportion.

6. The method according to claim 3, wherein a decreasing total exhaust gas return rate is set using an increasing exhaust gas mass flow upstream of the divergence for the low-pressure proportion.

7. The method according to claim 3, wherein a greater decrease is set for the low-pressure proportion than for a decrease in the total exhaust gas return rate.

8. The method according to claim 4, wherein a greater decrease is set for the low-pressure proportion than for a decrease in the total exhaust gas return rate.

9. The method according to claim 5, wherein a greater decrease is set for the low-pressure proportion than for a decrease in the total exhaust gas return rate.

10. The method according to claim 1, wherein the low-pressure proportion is set to be at least twice as large as after an operating period of the exhaust purification unit corresponding to a distance of at least 100,000 km for the associated motor vehicle.

11. The method according to claim 1, wherein by means of an SCR catalyst, a reduction of nitrogen oxides contained in the exhaust gas takes place downstream of an oxidation catalyst of the exhaust gas purification unit.

12. The method according to claim 11, wherein the low-pressure proportion or a quantity of post-injected fuel is set in such a way that a nitrogen dioxide proportion of nitrogen oxide contained in the exhaust gas on the output of the oxidation catalyst or on the input of the SCR catalyst is less than 70%.

13. The method according to claim 11, wherein the low-pressure proportion or a quantity of post-injected fuel is set in such a way that a nitrogen dioxide proportion of nitrogen oxide contained in the exhaust gas on the output of the oxidation catalyst or on the input of the SCR catalyst is less than 50%.

14. A method for operating a motor vehicle internal combustion engine having an exhaust tract with an exhaust gas purification unit which acts catalytically or by filtration, the method comprising:
supplementing combustion air by exhaust gas, diverging from the exhaust tract, that is fed to combustion chambers of the internal combustion engine at a total exhaust gas recirculation rate, wherein the total exhaust gas recirculation rate has a low-pressure proportion diverging downstream from the exhaust gas purification unit and a high-pressure proportion diverging upstream from an exhaust gas turbocharger turbine arranged in the exhaust tract; and
adjusting the low pressure proportion of the total exhaust gas recirculation rate, as the low-pressure proportion decreases for operating points of the internal combustion engine, as an operating period of the exhaust gas purification unit increases;
wherein at the operating points of the internal combustion engine, the total exhaust gas recirculation rate is kept constant as the operating period of the exhaust gas purification unit increases; and
wherein the decreasing low-pressure proportion is set with an increasing mass flow of exhaust gas upstream of the divergence for the low-pressure proportion.

15. The method according to claim 14, wherein a decreasing total exhaust gas return rate is set using an increasing exhaust gas mass flow upstream of the divergence for the low-pressure proportion.

16. The method according to claim 14, wherein a greater decrease is set for the low-pressure proportion than for a decrease in the total exhaust gas return rate.

* * * * *